United States Patent
Zuo et al.

(10) Patent No.: US 9,794,819 B2
(45) Date of Patent: Oct. 17, 2017

(54) METHOD AND DEVICE FOR ACTIVATING AND DEACTIVATING SECONDARY COMPONENT CARRIER IN CARRIER AGGREGATION

(71) Applicant: DATANG MOBILE COMMUNICATIONS EQUIPMENT CO., LTD, Beijing (CN)

(72) Inventors: Xiao Zuo, Beijing (CN); Long Zhang, Beijing (CN); Yuheng Zhou, Beijing (CN); Boya Mao, Beijing (CN); Yingrui Zhao, Beijing (CN)

(73) Assignee: Datang Mobile Communications Equipment Co., Ltd, Beijing (CN)

( * ) Notice: Subject to any disclaimer, the term of this patent is extended or adjusted under 35 U.S.C. 154(b) by 0 days.

(21) Appl. No.: 14/894,330

(22) PCT Filed: May 26, 2014

(86) PCT No.: PCT/CN2014/078426
§ 371 (c)(1),
(2) Date: Nov. 25, 2015

(87) PCT Pub. No.: WO2014/190885
PCT Pub. Date: Dec. 4, 2014

(65) Prior Publication Data
US 2016/0119216 A1    Apr. 28, 2016

(30) Foreign Application Priority Data

May 27, 2013    (CN) .......................... 2013 1 0201523

(51) Int. Cl.
*H04W 72/04*    (2009.01)
*H04W 24/10*    (2009.01)
(Continued)

(52) U.S. Cl.
CPC ............. *H04W 24/10* (2013.01); *H04L 5/001* (2013.01); *H04L 5/0044* (2013.01);
(Continued)

(58) Field of Classification Search
None
See application file for complete search history.

(56) References Cited

U.S. PATENT DOCUMENTS

| | | | |
|---|---|---|---|
| 8,184,599 B2 * | 5/2012 | Gholmieh | H04W 76/048 370/335 |
| 8,270,988 B1 * | 9/2012 | Sarkar | H04W 16/04 370/331 |

(Continued)

FOREIGN PATENT DOCUMENTS

| | | |
|---|---|---|
| CN | 102215551 A | 10/2011 |
| CN | 102387508 A | 3/2012 |

(Continued)

OTHER PUBLICATIONS

PCT International Search Report for PCT Counterpart Application No. PCT/CN2014/078426, 5 pp. (including English translation), (Aug. 13, 2014).

(Continued)

*Primary Examiner* — Gregory Sefcheck
(74) *Attorney, Agent, or Firm* — Blakely, Sokoloff, Taylor & Zafman LLP

(57) ABSTRACT

The present invention relates to communication technology. Disclosed are a method and device for activating and deactivating a secondary component carrier (SCC) in carrier aggregation. When the cache data volume reported by an RLC reaches an activation data volume threshold, increasing the count value of an SCC activation counter instead of directly activating an SCC; when determining that a monitor condition is met, and if the ratio of the count value of the (Continued)

---

MAC monitors a cache data volume reported each time by RLC, and when the cache data volume reaches an activation data volume threshold, increases a count value of an SCC activating counter — S101

When a monitoring requirement is met and a ratio of the count value of the SCC activating counter and a value of reported times of the RLC reaches a preset activating threshold, the SCC is activated — S102

SCC activation counter and the report times of the RLC reaches a set activation threshold, then indicating that the cache data volumes reported for multiple times all reach the activation data volume threshold, and then activating the SCC, thus avoiding multiple activations and deactivations during a short time, and improving SCC rate stability.

6 Claims, 2 Drawing Sheets

(51) Int. Cl.
*H04L 5/00* (2006.01)
*H04L 29/08* (2006.01)
(52) U.S. Cl.
CPC ........ *H04L 5/0064* (2013.01); *H04L 67/2842* (2013.01); *H04W 72/0453* (2013.01); *H04L 5/0098* (2013.01)

(56) References Cited

U.S. PATENT DOCUMENTS

| | | | | |
|---|---|---|---|---|
| 8,619,727 B1* | 12/2013 | Dinan | ............... | H04W 56/0005 370/329 |
| 8,638,685 B2* | 1/2014 | Aminaka | .............. | H04W 52/16 370/252 |
| 8,724,550 B2* | 5/2014 | Kone | ....................... | H04L 5/001 370/328 |
| 8,792,376 B2* | 7/2014 | Jang | ...................... | H04W 24/02 370/252 |
| 8,854,976 B2* | 10/2014 | Xi | ........................... | H04L 5/001 370/225 |
| 8,855,095 B2* | 10/2014 | Tseng | ..................... | H04L 5/001 370/328 |
| 8,861,457 B2* | 10/2014 | Xu | ........................... | H04L 1/00 370/329 |
| 8,917,605 B2* | 12/2014 | Pelletier | .............. | H04W 52/365 370/236 |
| 8,976,699 B2* | 3/2015 | Jang | ...................... | H04W 24/02 370/252 |
| 8,989,107 B2* | 3/2015 | Sambhwani | ...... | H04W 72/0453 370/329 |
| 9,088,902 B2* | 7/2015 | Ojala | ...................... | H04L 5/001 |
| 9,113,450 B2* | 8/2015 | Pelletier | ................ | H04W 74/04 |
| 9,131,363 B2* | 9/2015 | Vujcic | ................. | H04B 7/15507 |
| 9,288,803 B2* | 3/2016 | Jang | ...................... | H04W 24/02 |
| 9,295,052 B2* | 3/2016 | Jang | ...................... | H04W 24/02 |
| 9,301,188 B2* | 3/2016 | Jang | ...................... | H04W 24/02 |
| 9,307,528 B2* | 4/2016 | Jang | ...................... | H04W 24/02 |
| 9,392,597 B2* | 7/2016 | Chmiel | ............... | H04W 72/042 |
| 9,407,404 B2* | 8/2016 | Xi | ............................ | H04L 5/003 |
| 9,414,316 B2* | 8/2016 | Ishii | ....................... | H04L 5/001 |
| 9,497,763 B2* | 11/2016 | Feuersaenger | ........ | H04L 5/0096 |
| 2013/0136015 A1* | 5/2013 | Ojala | ..................... | H04L 5/001 370/252 |
| 2015/0305039 A1* | 10/2015 | Sebire | .................... | H04L 5/001 370/329 |
| 2016/0029233 A1* | 1/2016 | Kollar | ................... | H04W 24/08 370/252 |

FOREIGN PATENT DOCUMENTS

| | | |
|---|---|---|
| CN | 103298123 A | 9/2013 |
| WO | WO 2012/023839 A2 | 2/2012 |
| WO | WO 2012/123070 A1 | 9/2012 |

OTHER PUBLICATIONS

PCT Written Opinion of the International Searching Authority for PCT Counterpart Application No. PCT/CN2014/078426, 7 pp. (including English translation), (Aug. 13, 2014).

* cited by examiner

METHOD AND DEVICE FOR ACTIVATING AND DEACTIVATING SECONDARY COMPONENT CARRIER IN CARRIER AGGREGATION

CROSS-REFERENCE TO RELATED APPLICATIONS

This patent application is a U.S. National Phase Application under 35 U.S.C. §371 of International Application No. PCT/CN2014/078426, filed on May 26, 2014, entitled METHOD AND DEVICE FOR ACTIVATING AND DEACTIVATING SECONDARY COMPONENT CARRIER IN CARRIER AGGREGATION, designating the United States, and claiming priority to Chinese Patent Application No. 201310201523.8, filed with the State Intellectual Property Office of People's Republic of China on May 27, 2013, and entitled "Method and device for activating and deactivating secondary component carrier in carrier aggregation", the content of which was incorporated by reference in its entirety.

FIELD

The present application relates to communication technologies, and particularly to a secondary component carrier activating and deactivating method and device in carrier aggregation.

BACKGROUND

Carrier aggregation technology is introduced in the Long Term Evolution-Advanced (LTE-Advanced) system, and aggregating two or more basic carriers, it meets the bandwidth requirement for the LTE-Advance system. In carrier aggregation, each User Equipment (UE) may be assigned with multiple carrier components (CCs), which are used for communication with large data load.

When a Secondary Component Carrier (SCC) is activated, the UE will transmit a Sounding Reference Symbol (SRS) and report a Channel Quality Indicator/Precoding Matrix Indicator/Rank Indicator (CQI/PMI/RI) in a Secondary Cell (SCell) according to the configuration. The UE will also monitor the Physical Downlink Control Channel (PDCCH) in the SCell. When the data load of the UE is not heavy and the SCC is not required, the UE will nonetheless perform blind detection, which consumes the power to the UE and lowers the efficiency. In this condition, it requires to deactivate the SCC.

Specifically, after the SCC is deactivated, the UE will:
(1) stop transmitting the SRS in the SCell;
(2) stop reporting the CQI/PMI/RI in the SCell;
(3) stop sending the Physical Uplink Shared Channel (PUSCH) in the SCell;
(4) stop monitoring the PDCCH in the SCell; and
(5) stop monitoring control information of the SCell from the PDCCH over a scheduled carrier during cross-carrier scheduling.

After the SCC is activated, the UE will:
(1) transmit the SRS in the SCell according to the configuration;
(2) report the CQI/PMI/RI in the SCell according to the configuration;
(3) monitor the PDCCH in the SCell, and receive PUSCH data according to scheduling information; and
(4) monitor control information of the SCell from the PDCCH over a scheduled carrier during cross-carrier scheduling.

Currently, activation and deactivation actions are performed according to data load per millisecond, therefore it is likely to perform multiple activation and deactivation actions within a short time. Because scheduling of an SCC has to wait until ACK (confirmation) for data packet of a Media Access Control Control Element (MAC CE) is feedback, excessive activation and deactivation actions may influence the velocity stability of the SCC.

BRIEF SUMMARY

Embodiments in this disclosure disclose a method of and a device for activating and deactivating an SCC in carrier aggregation, to improve the velocity stability of the SCC.

A method of activating an SCC in carrier aggregation, including:
Media Access Control (MAC) monitoring a cache data volume reported each time by Radio Link Control (RLC), and when the cache data volume reaches an activation data threshold, increasing a count value of an SCC activating counter; and
   when a monitoring requirement is met and a ratio of the count value of the SCC activating counter and a value of reported times of the RLC reaches a preset activating threshold, activating the SCC.
Preferably, the monitoring requirement is met when:
a monitoring cycle is reached; or
the value of the reported times of the RLC reaches the preset activating threshold.
Preferably, the activating the SCC includes:
transmitting by the MAC over a Primary Component Carrier (PCC) a MAC CE for activation in carrier aggregation; and
after confirming downlink data packets of the MAC CE are correctly communicated, the MAC sending an SCC activation message to RLC of a primary cell and MAC of a secondary cell.
Preferably, after activating the SCC, the method further includes:
the MAC receiving a cache data volume reported again by the RLC;
the MAC multiplying the cache data volume reported again by the RLC with a preset factor, and scheduling resources according to the product from the multiplying.

A method of deactivating an SCC in carrier aggregation, including:
MAC monitoring a cache data volume reported each time by RLC, and when the cache data volume is below a deactivation data volume threshold, increasing a count value of an SCC deactivating counter; and
   when a monitoring requirement is met and a ratio of the count value of the SCC deactivating counter and a value of reported times of the RLC reaches a preset deactivating threshold, deactivating the SCC.
Preferably, the monitoring requirement is met when:
a monitoring cycle is reached; or
the value of the reported times of the RLC reaches the preset deactivating threshold.
Preferably, the deactivating the SCC includes:
MAC transmitting over a PCC a MAC CE for deactivation in carrier aggregation; and after confirming downlink data packets of the MAC CE are correctly communicated, the MAC sending an SCC deactivation message to RLC of a primary cell and MAC of a secondary cell.

A device for activating an SCC in carrier aggregation, including:
an activation monitoring component configured to monitor a cache data volume reported each time by RLC, and when the cache data volume reaches an activation data volume threshold, to increase a count value of an SCC activating counter; and
an activation component configured to activate the SCC when a monitoring requirement is met and a ratio of the count value of the SCC activating counter and a value of reported times of the RLC reaches a preset activating threshold.

Preferably, the activation component determines that the monitoring requirement is met when:
the activation component determines that a monitoring cycle is reached; or
the activation component determines that the value of the reported times of the RLC reaches the preset activating threshold.

Preferably, the activation component is configured to activate the SCC by:
transmitting over a PCC a MAC CE for activation in carrier aggregation; and
after confirming downlink data packets of the MAC CE are correctly communicated, sending an SCC activation message to RLC of a primary cell and MAC of the secondary cell.

Preferably, after activating the SCC, the activation component is further configured to:
receive a cache data volume reported again by the RLC; and
multiply the cache data volume reported again by the RLC with a preset factor, and schedule resources according to the product.

A device for activating an SCC in carrier aggregation, including:
a processor configured to execute a computer program with the following functions: monitoring a cache data volume reported each time by RLC, and when the cache data volume reaches an activation data volume threshold, increasing a count value of an SCC activating counter; and when a monitoring requirement is met and a ratio of the count value of the SCC activating counter and a value of reported times of the RLC reaches a preset activating threshold, activating the SCC; and
a storage device configured to store the code of said computer program.

A device for deactivating an SCC in carrier aggregation, including:
a deactivation monitoring component configured to monitor a cache data volume reported each time by RLC, and when the cache data volume is below a deactivation data volume threshold, to increase a count value of an SCC deactivating counter; and
a deactivation component configured to deactivate the SCC when a monitoring requirement is met and a ratio of the count value of the SCC deactivating counter and a value of reported times of the RLC reaches a preset deactivating threshold.

Preferably, the deactivation component determines that the monitoring requirement is met when:
the deactivation component determines that a monitoring cycle is reached; or
the deactivation component determines that the value of the reported times of the RLC reaches the preset deactivating threshold.

Preferably, the deactivation component is configured to deactivate the SCC by:
transmitting over a PCC a MAC CE for deactivation in carrier aggregation; and
after confirming downlink data packets of the MAC CE are correctly communicated, sending an SCC deactivation message to primary cell RLC and secondary cell MAC.

A device for deactivating an SCC in carrier aggregation, including:
a processor configured to execute a computer program with the following functions: monitoring a cache data volume reported each time by RLC, and when the cache data volume is below a deactivation data volume threshold, increasing a count value of an SCC deactivating counter; and when a monitoring requirement is met and a ratio of the count value of the SCC deactivating counter and a value of reported times of the RLC reaches a preset deactivating threshold, deactivating the SCC; and
a storage device configured to store the code of said computer program.

Embodiments of the invention provide a method of and a device for activating and deactivating SCC(s) in carrier aggregation. When a cache data volume reported by Radio Link Control (RLC) reaches an activating data volume threshold, the SCC is not activated directly and a count value of an SCC activating counter is increased; when a monitoring requirement is met, and if a ratio of the count value of the SCC activating counter and the specific value of reported times of the RLC reaches a preset activating threshold, it means that multiple reported cache data volumes reach the activating data volume threshold, and then the SCC is activated. Therefore, multiple activation and deactivation actions in a short time are avoided, and velocity stability of the SCCs is improved.

DETAILED DESCRIPTION OF THE EMBODIMENTS

Embodiments of the invention provide a method of and a device for activating and deactivating an SCC in carrier aggregation. When a cache data volume reported by RLC reaches an activating data volume threshold, the SCC is not activated directly and a count value of an SCC activating counter is increased; when a monitoring requirement is met and a ratio of the count value of the SCC activating counter and the specific value of reported times of the RLC reaches a preset activating threshold, it means that multiple reported cache data volumes reach the activating data volume threshold, and then the SCC is activated. Therefore, multiple activation and deactivation actions in a short time are avoided, and velocity stability of the SCCs is improved.

Figure 1:
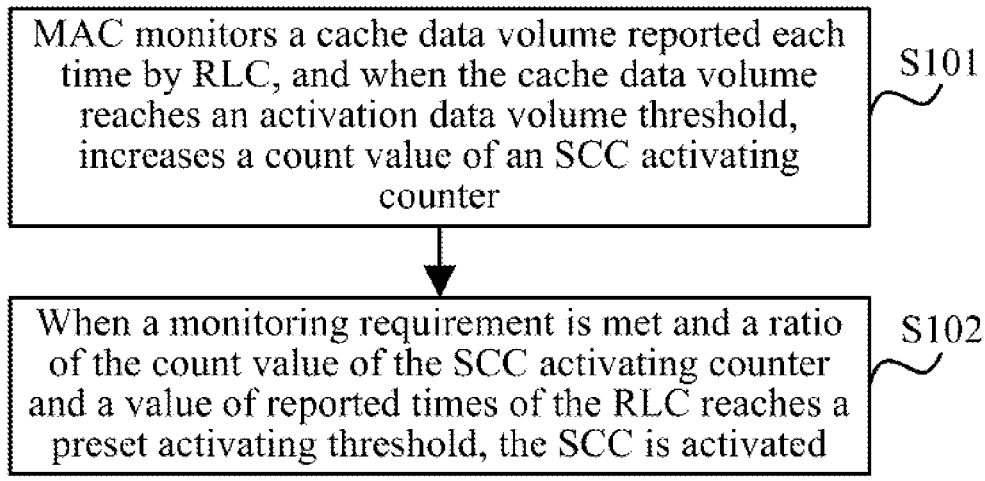
FIG. 1 is a flowchart of a method of activating an SCC in carrier aggregation according to an embodiment.

As shown in FIG. 1, a method of activating an SCC in carrier aggregation according to an embodiment includes the following operations.

Operation S101. Media Access Control (MAC) monitors a cache data volume reported each time by RLC, and when the cache data volume reaches an activation data volume threshold, increases the count value of an SCC activating counter;

Operation S102. When a monitoring requirement is met, and if the ratio of the count value of the SCC activating counter and the specific value of reported times of the RLC reaches a preset activating threshold, the SCC is activated.

The method of activating an SCC in carrier aggregation is generally performed by primary component carrier MAC.

When the ratio of the count value of the SCC activating counter and the specific value of reported times of the RLC reaches the preset activating threshold, it shows a large number of large cache data volumes reported by the RLC, and then the SCC is activated. The activated SCC is not likely to be deactivated in a short time period, therefore velocity stability of the SCC is improved.

Said monitoring requirement may be preset as reaching a monitoring cycle; or the value of the reported times of the RLC reaches the preset activating threshold. In operation S102, the monitoring requirement is determined to be met when:
  the monitoring cycle is determined to be reached; or
  the value of the reported times of the RLC is determined to reach the preset activating threshold.

It is to be understood that those skilled in the art may set appropriate monitoring requirements according to individual situations, which are not stated here in detail.

During activating the SCC, the MAC may transmit over a Primary Component Carrier (PCC) a Media Access Control Control Element (MAC CE) for activation in carrier aggregation; and after confirming downlink data packets of the MAC CE are correctly communicated, the MAC sends an SCC activation message to primary cell RLC and secondary cell MAC.

Additionally, after activating the SCC, the primary component carrier MAC receives a cache data volume reported again by the RLC, multiplies the cache data volume reported again by the RLC with a preset factor, and schedules resources according to the product from the multiplying. Said factor may be predetermined according to user working environment and a service requirement, and typically is preferred to be between 0.5 to 0.8.

Figure 2:
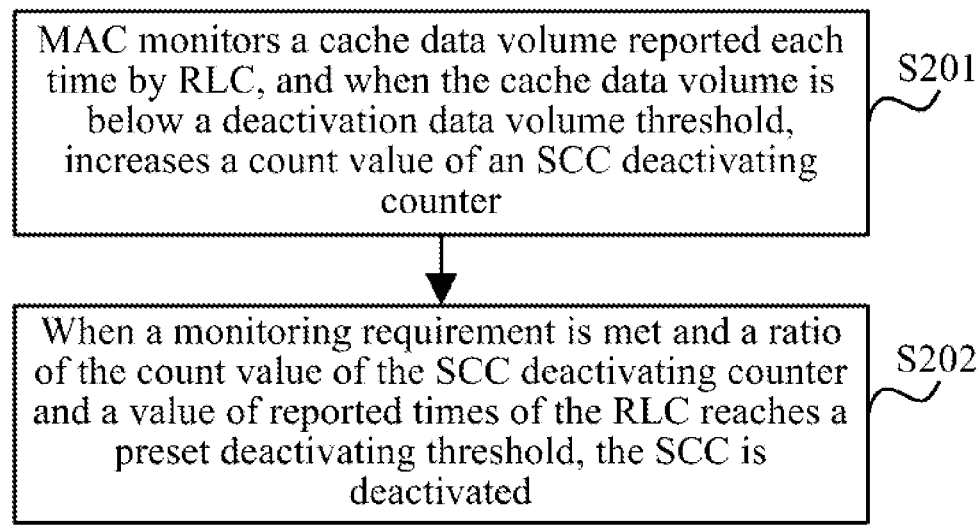
FIG. 2 is a flowchart of a method of deactivating an SCC in carrier aggregation according to an embodiment.

Based upon the same inventive idea, as shown in FIG. 2, a method of deactivating an SCC in carrier aggregation is further provided in an embodiment. The method includes the following operations.

Operation S201. MAC monitors a cache data volume reported each time by RLC, and when the cache data volume is below a deactivation data volume threshold, increases the count value of an SCC deactivating counter;

Operation S202. When a monitoring requirement is met, and if the ratio of the count value of the SCC deactivating counter and the specific value of reported times of the RLC reaches a preset deactivating threshold, the SCC is deactivated.

Said method of deactivating an SCC in carrier aggregation is generally performed by primary component carrier MAC.

Similarly, in operation S202, the monitoring requirement is determined to be met when:
  a monitoring cycle is determined to be reached; or
  the value of the reported times of the RLC is determined to reach the preset deactivating threshold.

In operation S202, the deactivating the SCC includes:
  the MAC transmitting over a PCC a MAC CE for deactivation in carrier aggregation; and
  after confirming downlink data packets of the MAC CE are correctly communicated, the MAC sending an SCC deactivation message to RLC of the primary cell and MAC of the secondary cell.

Specifically, in application, thresholds and counters may be set as follows:

(1) ScellActiveThroughputThr represents the activation data volume threshold. When the value in Buffer Occupy (BO) reported by RLC to MAC exceeds the activation data volume threshold, the SCC activating counter adds 1.

(2) ScellDeActiveThroughputThr represents the deactivation data volume threshold. When the value in BO number reported to MAC from RLC is below the deactivation data volume threshold, the SCC deactivating counter adds 1.

(3) ScellActiveThr represents the activating threshold expressed in percent for SCC activation. When the ratio calculated exceeds the activating threshold expressed in percent for SCC activation, the SCC is activated.

(4) ScellDeActiveThr represents the deactivating threshold expressed in percent for SCC deactivation. When the ratio calculated exceeds the deactivating threshold expressed in percent for SCC deactivation, the SCC is deactivated.

(5) SccActiveNum represents the SCC activating counter.

(6) SccDeActiveNum represents the SCC deactivating counter.

(7) BoMonitorNum represents the value of reported times of the RLC reporting the cache data volume.

(8) T represents the monitoring cycle.

By monitoring and updating above thresholds, MAC can timely track the working data volume of UE, and determine whether it reaches the threshold of activation or deactivation, therefore to inform the UE, PCell RLC and SCell MAC of information about subcarriers.

SCC activation and deactivation can be realized as following:

(1) MAC monitors the size of the cache data volume reported by RLC, updates relevant count value, performs a calculation on the count value during the interval of monitoring cycle, and determines whether it attains the activating or deactivating threshold expressed in percent.

(2) The initial values of counters SccActiveNum, SccDeActiveNum and BoMonitorNum are 0. When reaching a corresponding threshold, the value of a corresponding counter adds 1; otherwise only BoMonitorNum, which reflects the value of times of monitoring, adds 1. The relevant counters are reset after activation or deactivation.

(3) After confirming the downlink data packets of SCC activation or deactivation MAC CE are correctly communicated, MAC sends SCC status to RLC and Secondary Cell (SCell) MAC via an interface message, and continues to monitor the value of BO reported by RLC.

Specifically, the method of activating or deactivating a SCC in carrier aggregation in an embodiment includes the following operations.

Operation 1: before an SCC is activated, MAC monitors the size of the cache data volume (i.e., value of BO) reported by RLC following the interval of monitoring cycle T. When a monitoring cycle starts, the values of SccActiveNum and BoMonitorNum are reset to 0.

Operation 2: when the cache data volume exceeds the activation data volume threshold ScellActiveThroughputThr, SccActiveNum and BoMonitorNum are added by 1 respectively. If the cache data volume is below the activation data volume threshold ScellActiveThroughputThr, only BoMonitorNum is added by 1.

Operation 2: when the cycle T is reached, and if SccActiveNum/BoMonitorNum*100%>ScellActiveThr, MAC sends out carrier aggregation activation MAC CE. After confirming the downlink data packets of the MAC CE are correctly communicated, MAC sends an SCC activation message to Primary Cell (PCell) RLC and SCell MAC.

Operation 3: after the SCC is activated, when PCC and SCC MAC performs scheduling after receiving BO, to avoid over-allocation of resources, the BO value reported by RLC is multiplied by a predetermined factor, and resources are allocated according to the product.

Operation 4: after the SCC is activated, the MAC continues to monitor the BO value reported by RLC. If the data volume is below the deactivation data volume threshold ScellDeActiveThroughputThr, SccDeActiveNum and BoMonitorNum are added by 1 respectively. If the data volume exceeds the deactivation data volume threshold ScellDeActiveThroughputThr, only BoMonitorNum is added by 1.

Operation 5: when the cycle T is reached, and if SccDeActiveNum/BoMonitorNum*100%>ScellDeActiveThr, the MAC transmits over the PCC carrier aggregation deactivation MAC CE. After confirming the downlink data packets of the MAC CE are correctly communicated, the MAC sends an SCC deactivation message to PCell RLC and SCell MAC.

Figure 3:
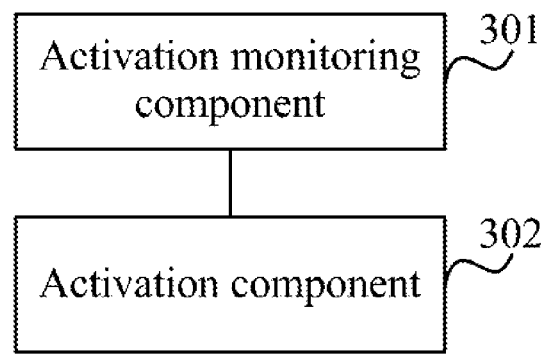
FIG. 3 is a structure illustration of a device for activating an SCC in carrier aggregation according to an embodiment.

Based upon the same inventive idea, as shown in FIG. 3, a device for activating an SCC in carrier aggregation is provided in an embodiment. The device may be specifically MAC. The device includes the following components.

An activation monitoring component 301 is configured to monitor a cache data volume reported each time by RLC, and when the cache data volume reaches an activation data threshold, to increase the count value of an SCC activating counter.

An activation component 302 is configured to activate the SCC when a monitoring requirement is met and a ratio of the count value of the SCC activating counter and the specific value of reported times of the RLC reaches a preset activating threshold.

The activation component 302 determines that the monitoring requirement is met when:
 the activation component determines that a monitoring cycle is reached; or
 the activation component determines that the value of the reported times of the RLC reaches the preset activating threshold.

The activation component 302 is configured to activate the SCC by:
 transmitting over a PCC a carrier aggregation activation MAC CE; and
 after confirming the downward data packets of the MAC CE are correctly communicated, sending an SCC activation message to Pcell RLC and SCell MAC.

After activating the SCC, the activation component 302 is further configured to:
 receive a cache data volume reported again by RLC; and
 multiply the cache data volume reported again by RLC with a preset factor, and schedule resources according to the product.

Figure 4:
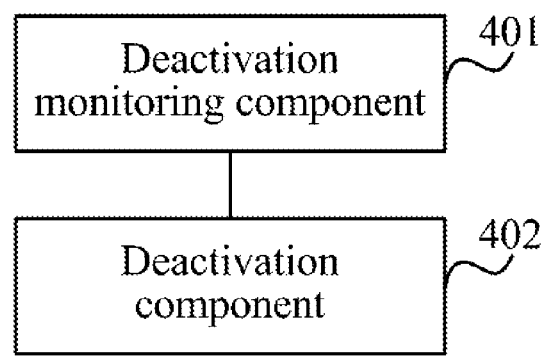
FIG. 4 is a structure illustration of a device for deactivating an SCC in carrier aggregation according to an embodiment.

As shown in FIG. 4, a device for deactivating an SCC in carrier aggregation is provided in an embodiment. The device may be specifically MAC. The device includes the following components.

A deactivation monitoring component 401 is configured to monitor a cache data volume reported each time by RLC, and when the cache data volume is below a deactivation data threshold, to increases a count value of an SCC deactivating counter.

A deactivation component 402 is configured to deactivate the SCC when a monitoring requirement is met and a ratio of the count value of the SCC deactivating counter and the specific value of reported times of the RLC reaches a preset activating thresholds.

The deactivation component 402 determines that the monitoring requirement is met when:
 the deactivation component determines that the monitoring cycle is reached; or
 the deactivation component determines that the value of the reported times of the RLC reaches the preset deactivating threshold.

The deactivation component 402 is configured to deactivate the SCC by:
 transmitting over a PCC a carrier aggregation deactivation MAC CE; and
 after confirming the downward data packets of the MAC CE are correctly communicated, sending an SCC deactivation message to PCell RLC and SCell MAC.

Embodiments provide a method of and a device for activating and deactivating an SCC in carrier aggregation. When a cache data volume reported by RLC reaches an activating data volume threshold, the SCC is not activated directly and a count value of an SCC activating counter is increased; when a monitoring requirement is met, and if a ratio of the count value of the SCC activating counter and the specific value of reported times of the RLC reaches a preset activating threshold, it means that multiple reported cache data volumes reach the activating data volume threshold, and then the SCC is activated. Therefore, multiple activation and deactivation actions in a short time are avoided, and velocity stability of the SCCs is improved.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the essence and scope of the invention. Thus the invention is also intended to encompass these modifications and variations thereto so long as the modifications and variations come into the scope of the claims appended to the invention and their equivalents.

What is claimed is:

1. A method of activating a Secondary Component Carrier, SCC, in carrier aggregation, comprising:
    Media Access Control, MAC, monitoring a cache data volume reported each time by Radio Link Control, RLC, and when the cache data volume reaches an activation data volume threshold, increasing a count value of an SCC activating counter;
    and
    when a monitoring requirement is met and a ratio of the count value of the SCC activating counter and a value of reported times of the RLC reaches a preset activating threshold, activating the SCC;
    wherein after activating the SCC, the method further comprises:
    receiving, by the MAC, a cache data volume reported again by the RLC; and
    after multiplying the cache data volume reported again by the RLC with a preset factor, scheduling, by the MAC, resources according to a product from the multiplying.

2. The method of claim 1, wherein the monitoring requirement is met when:
    a monitoring cycle is reached;
    or
    the value of the reported times of the RLC reaches a preset threshold.

3. The method of claim 1, wherein the activating the SCC comprises:
    transmitting, by the MAC over a Primary Component Carrier, PCC, a Media Access Control Control Element, MAC CE for activation in carrier aggregation;
    and
    after confirming downlink data packets of the MAC CE are correctly communicated, the MAC sending an SCC activation message to primary cell RLC and secondary cell MAC.

4. A device for activating an SCC in carrier aggregation, comprising:
    an activation monitoring component configured to monitor a cache data volume reported each time by RLC, and when the cache data volume reaches an activation data volume threshold, to increase a count value of an SCC activating counter;
    and
    an activation component configured to activate the SCC when a monitoring requirement is met and a ratio of the count value of the SCC activating counter and a value of reported times of the RLC reaches a preset activating threshold;
    wherein after activating the SCC, the activation component is further configured to:
    receive a cache data volume reported again by the RLC; and
    multiply the cache data volume reported again by the RLC with a preset factor, and schedule resources according to a product.

5. The device of claim 4, wherein the activation component determines that the monitoring requirement is met when:
    the activation component determines that a monitoring cycle is reached;
    or
    the activation component determines that the value of the reported times of the RLC reaches a preset threshold.

6. The device of claim 4, wherein the activation component is configured to activate the SCC by:
    transmitting over a PCC a MAC CE for activation in carrier aggregation;
    and
    after confirming downlink data packets of the MAC CE are correctly communicated, sending an SCC activation message to primary cell RLC and secondary cell MAC.

* * * * *